March 3, 1936.  B. W. LINDQUIST  2,032,586
METHOD OF AND APPARATUS FOR FORMING SCREWS
Filed April 6, 1934  4 Sheets-Sheet 1
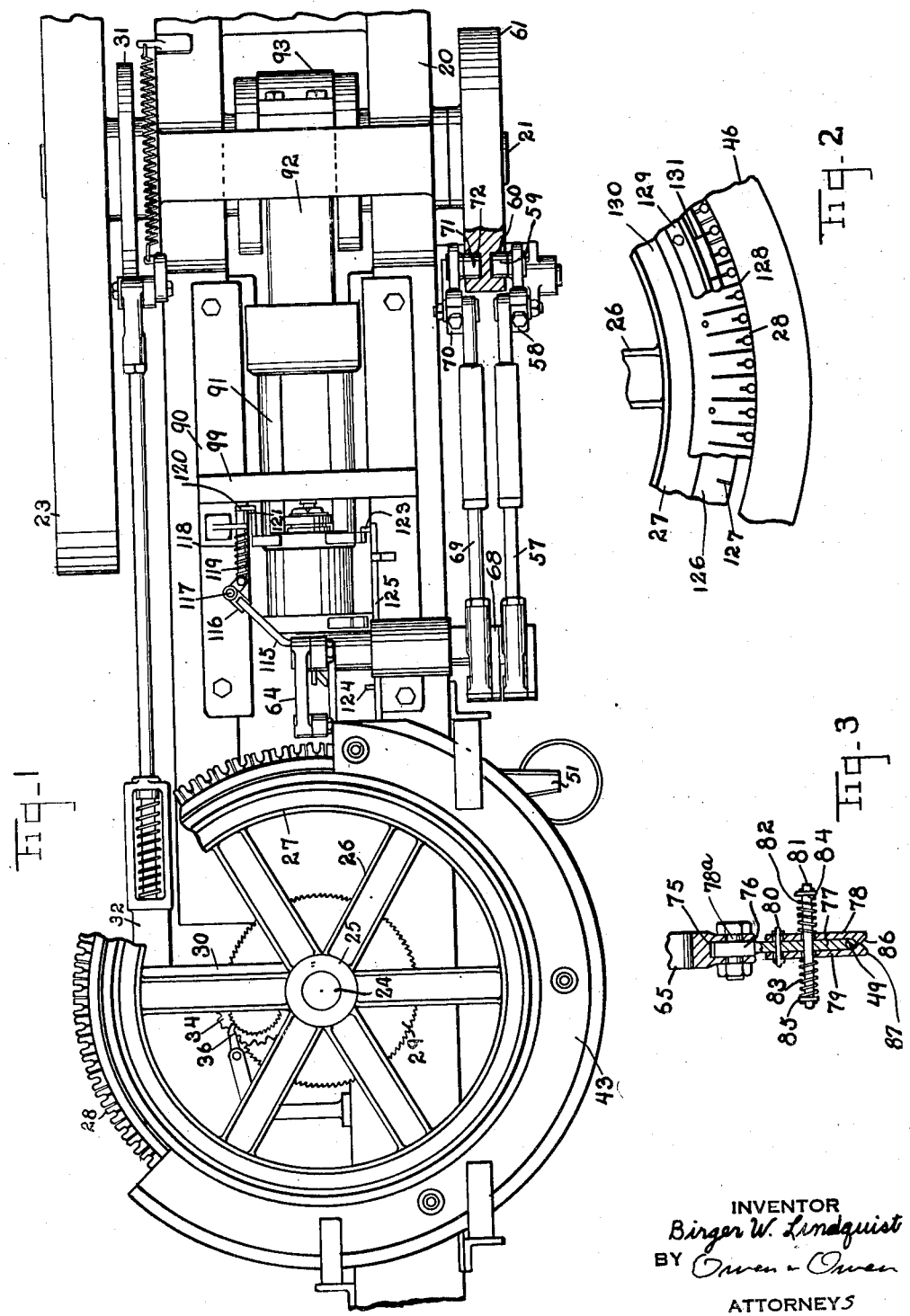
INVENTOR
Birger W. Lindquist
BY
ATTORNEYS

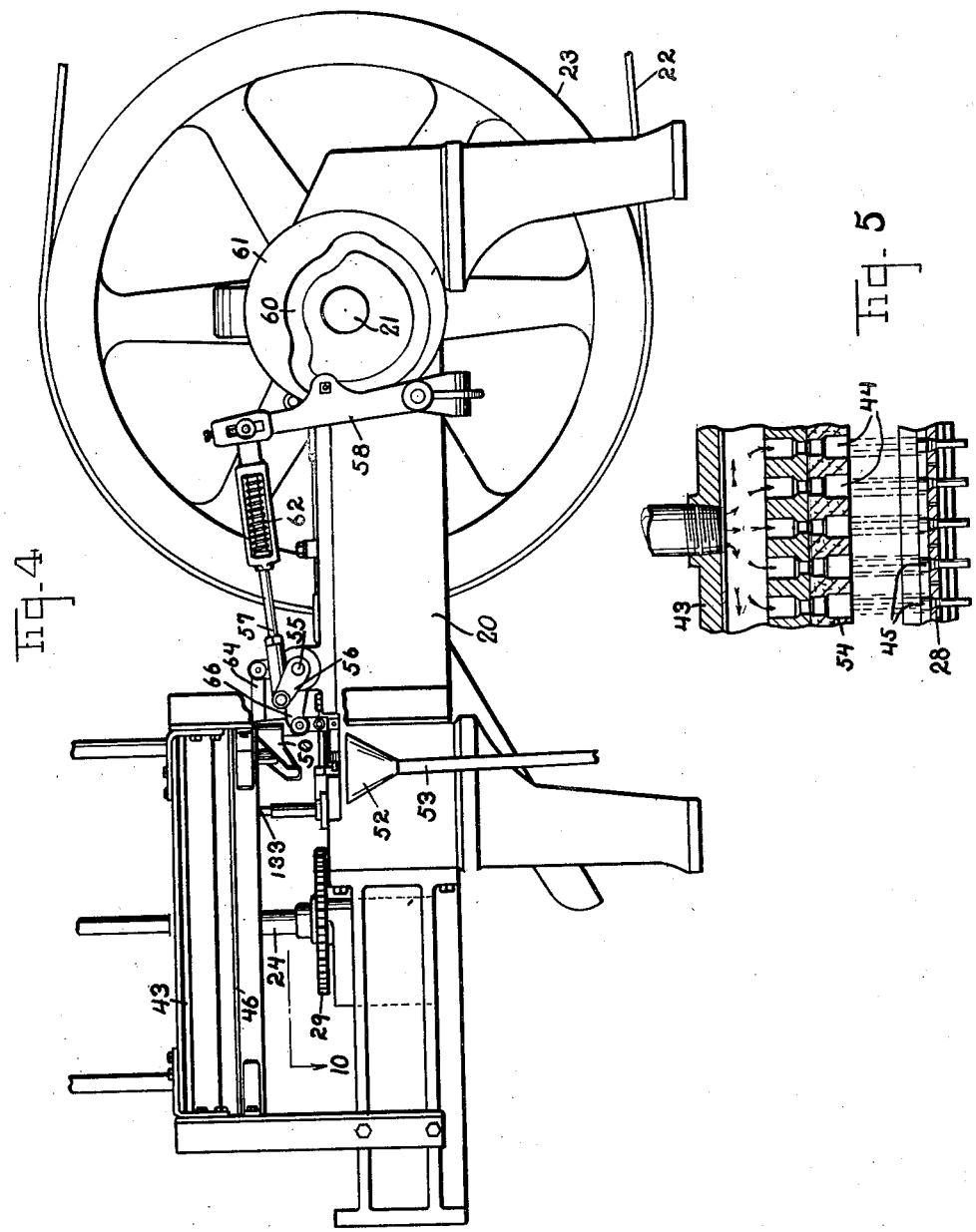

March 3, 1936.  B. W. LINDQUIST  2,032,586
METHOD OF AND APPARATUS FOR FORMING SCREWS
Filed April 6, 1934  4 Sheets-Sheet 3
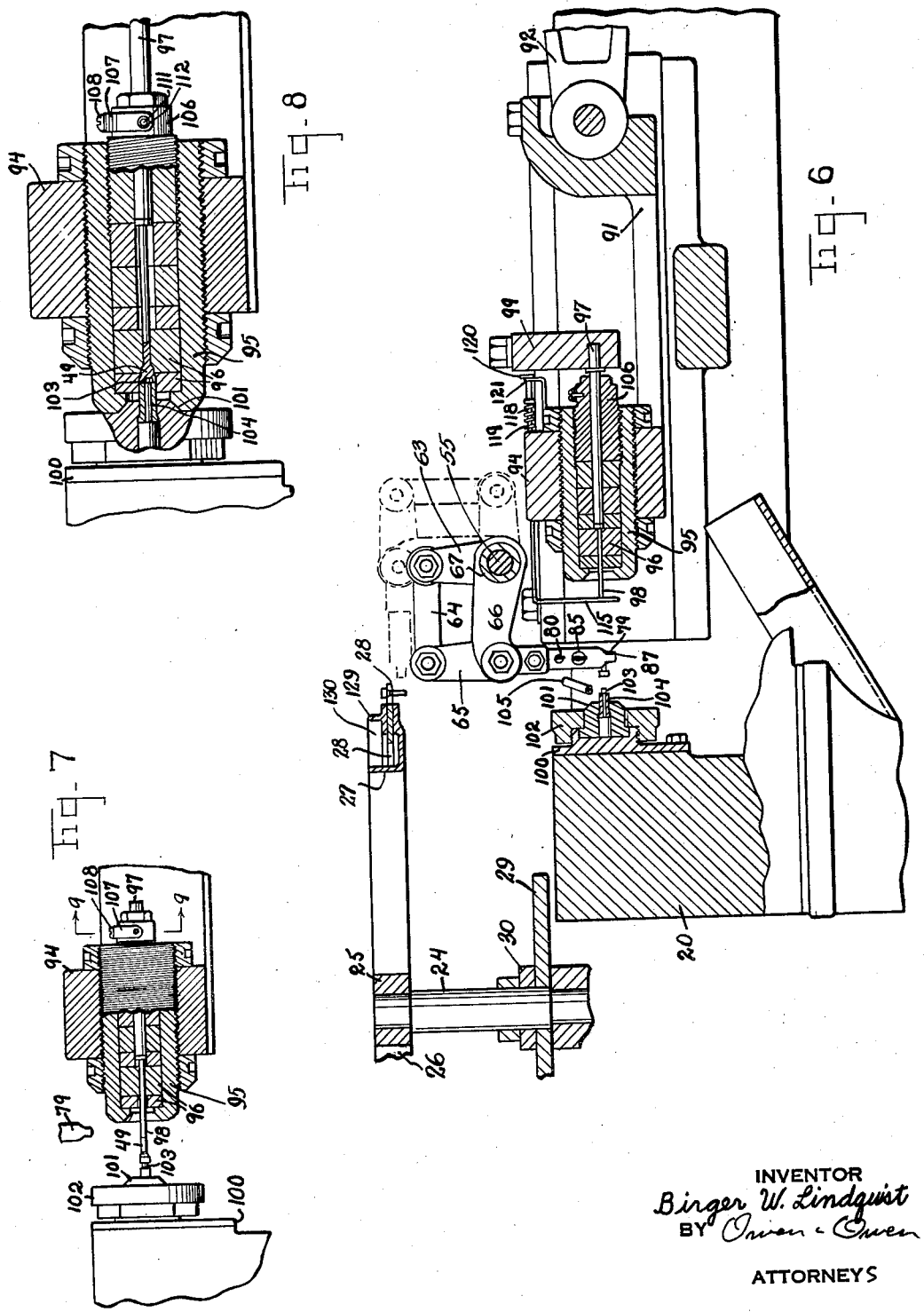
INVENTOR
Birger W. Lindquist
BY Owen & Owen
ATTORNEYS March 3, 1936.  B. W. LINDQUIST  2,032,586
METHOD OF AND APPARATUS FOR FORMING SCREWS
Filed April 6, 1934  4 Sheets-Sheet 4
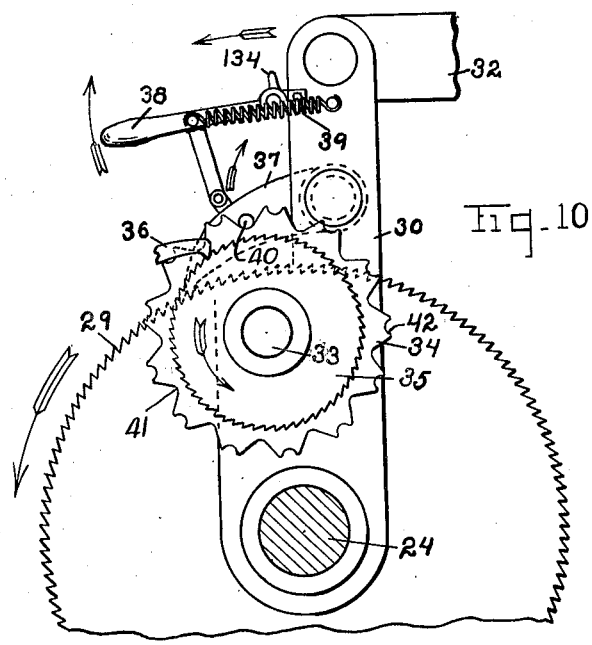
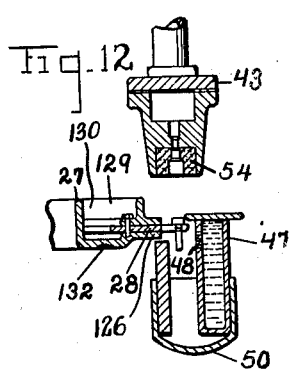
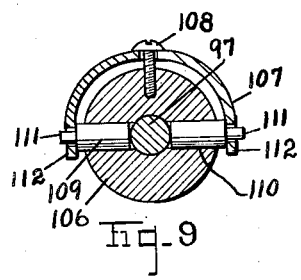
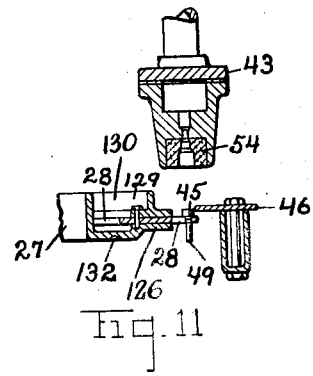
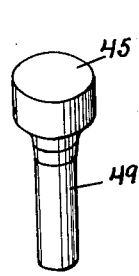
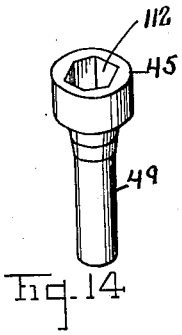
INVENTOR
Birger W. Lindquist
BY Owen & Owen
ATTORNEYS Patented Mar. 3, 1936

2,032,586

UNITED STATES PATENT OFFICE 2,032,586

METHOD OF AND APPARATUS FOR FORMING SCREWS

Birger W. Lindquist, Detroit, Mich.

Application April 6, 1934, Serial No. 719,267

8 Claims. (Cl. 10—27)

This application relates to a method of and apparatus for forming screws and is particularly applicable to the forming of the heads of screws where the heads are so shaped that they cannot be successfully formed by the cold heading process. More specifically the invention relates to the making of cap screws with socketed heads. This application is a continuation in part of my application 571,060 filed October 26, 1931.

Details and other objects of the invention will appear as the description proceeds.

Figure 1 is a plan view of one form of apparatus embodying the invention; Fig. 2 is a detail plan of a portion of a screw carrier; Fig. 3 is a detail section of a transfer device; Fig. 4 is a side elevation of the machine; Fig. 5 is a detail vertical section through a portion of the screw carrier and burner, taken longitudinally of the path of movement of the screws; Fig. 6 is a detail vertical section showing the transfer mechanism and associated parts; Fig. 7 is a detail section on the same plane as Fig. 6, showing the screw in position to be acted upon; Fig. 8 is a view similar to Fig. 7 but showing the screw as shaping is completed; Fig. 9 is a section on the line 9—9 of Fig. 7; Fig. 10 is a partial plan section approximately on the line 10—10 of Fig. 4; Fig. 11 is a vertical detail section across a portion of the screw carrier and heating burner; Fig. 12 is a view similar to Fig. 11, but taken across the carrier just before the transfer position; Fig. 13 is a view of a blank suitable for treatment in the illustrated mechanism; and Fig. 14 is a view of the blank after treatment.

The mechanism disclosed in the drawings is mounted upon a frame 20. A main drive shaft 21 may be driven by a belt 22 on a pulley 23 or by other suitable means.

Near the other end of the frame there is mounted a vertical shaft 24 having a carrier 25. This carrier is composed of a series of spokes 26 upon which is mounted an annular trough 27, the outer edge of which carries a notched ring 28.

Below the carrier there is mounted on shaft 24 a ratchet wheel 29. Above the wheel there is pivoted on shaft 24 an arm 30 which is oscillated by a cam 31 on main shaft 21 through a link 32 in an obvious manner. Upon a fixed stud 33 above the arm there is mounted a notched wheel 34, having fast thereto a ratchet wheel 35 held by a pawl 36 against rotation in one direction. A pawl 37 mounted upon arm 30 may be swung to active or inactive position by a handle 38 and held in such position by a spring 39. A pin 40 on pawl 37 cooperates with deep notches 41 or shallow notches 42 in wheel 34, notches 41 permitting the end of the pawl to contact and operate ratchet wheel 29, while notches 42 hold the pawl out of operative relation with the ratchet wheel.

An arcuate burner member 43 is arranged above the travel of ring 28 and has in its lower side a plurality of burner openings 44 in position to direct flames upon the heads 45 of the blanks as they are carried beneath the burner. See Figures 2, 4, 5 and 11. An arcuate plate 46 is positioned beneath the burner and in position to hold heads 45 definitely in the notches of the rings so that they are correctly positioned beneath the burner. Immediately outside of the path of the blanks carried by ring 28, as they approach the central line of the machine, there is a receptacle 47 adapted to contain cooling water under pressure. See Figure 12. Perforations 48 in the wall of receptacle 47 are located to direct jets of water against the shank 49 of the blank just before it reaches the end of burner 43 and the median line of the machine. Beneath the receptacle 47 there is a trough 50 having a discharge spout 51 delivering the water from holes 48 to a funnel 52 and pipe 53 which carries it off to any desired place.

As shown in Fig. 5, the annular burner is provided with an annular refractory member 54 having combustion cavities therein registering with the discharge openings from the annular supply passage for gas. The combustion cavities are spaced apart the same distance as the notches in ring 28, and the flames are directed onto the heads of the screws in each of their successive positions to which they are moved by the intermittent movement of the carrier.

When the blank reaches the median line of the machine, as shown in Fig. 6, it is seized by a transfer device. This transfer device is mounted upon a rock shaft 55 on the end of which there is mounted an arm 56 connected by a link 57 to the upper end of a lever 58 which carries a cam roller 59 operating in a groove 60 in a cam 61 mounted on the end of main shaft 21. See Figures 1 and 4. Link 57 is provided with a yielding connection 62. On the other end of shaft 55 there is mounted an arm 63 connected by a link 64 to a lever 65 which in turn is pivoted in an arm 66 mounted on a sleeve 67 surrounding shaft 55. On the other end of sleeve 67 there is an arm 68 connected by a link 69 to a lever 70 having a roller 71 running in a cam slot 72 in the inner face of cam 61.

The lower end of lever 65 is provided with a socket 75 in which there is fastened the head 76 of a clamp member 77 by a bolt 78ª. See Figure 3.

On the two sides of member 77 there are clamp members 78 and 79 which are held in proper relation with member 77 by means of pins 80 and 81, springs 82 and 83 being interposed between members 78 and 79 and stops 84 and 85 on pin 81, so that members 78 and 79 are constantly pressed towards member 77 so that their heads 86 and 87 combine with the end of member 77 to clamp the shank 49 of a blank, as best shown in Fig. 3.

Along the median line of the machine there is a guideway 90 in which there moves a slide 91 operated by a pitman 92 from a crank 93 on the main drive shaft. Slide 91 has a head 94 in which there is mounted a die holder 95 containing tubular die blocks 96. A rod 97 having a reduced end 98 extends through the die blocks, and its rear end abuts against a fixed frame member 99.

In line with die holder 95 there is a backing plate 100 having a punch holder 101 held thereagainst by a screw cap 102. Within the punch holder 101 there is mounted a punch with an angular end 103 surrounded by a sleeve 104. A pipe 105 is in position to direct a stream of cooling liquid against the punch.

The rear block 106 within die holder 95 is screwed into position and holds the die blocks in place. On the extending end of block 106 there is mounted a spring 107 which is sprung to a desired degree by a set screw 108. See Figure 9. Pins 109 operate through a transverse bore 110 in block 106, their inner ends bearing against rod 97 and their outer ends being reduced at 111 and entering holes 112 in the ends of spring 107. By this means pins 109 are pressed to an adjustable degree against rod 97 by spring 107.

A knock-off finger 115 is mounted upon one arm of a bell crank lever 116 pivoted at 117 on slideway 90. A slide rod 118 connected to the other arm of lever 116 is surrounded by a spring 119 normally holding the finger in inoperative position. A lug 120 on the end of the rod is contacted by an abutment 121 on slide 91, as the slide nears the end of its inoperative stroke.

Instead of having the cooling liquid discharged constantly from pipe 105, it is preferable to provide a valve not shown which is controlled from slide 91 by means of lugs 123, 124 and a slide 125. See Figure 1.

As will be seen from detail views, Figs. 2, 6, and 12, trough 27 has an outwardly directed flange 126 on which ring 28 is mounted. This flange is provided with cuts 127 to form expansion joints, and cuts 128 are extended from the notches in ring 28 for the same purpose. Ring 28 can be held in place conveniently by a ring 129 which may form the upper part of the outer wall of trough 130 of member 27, plate 28 being clamped down by ring 129 so as to make a substantially water tight joint. In this way a trough is provided which may be filled with water or other cooling liquid so as to immerse the inner edge of ring 28 and effectually cool it. The outer part of ring 129 may be provided with expansion cuts 131. Thus ring 28 is supported from an effectually cooled portion while the outer portion of this ring and its supports may expand and contract with varying temperatures, as the carrier rotates, without disturbing the supporting connection.

Member 27 is provided on its under side with sockets 132 into which the beveled upper end of bolt 133, see Figure 4, may fit as the notches successively register therewith. The bolt is constantly spring pressed upward.

Having described the general construction of the apparatus, the operation will now be disclosed. Suitable blanks, such as shown in Fig. 13, are supplied to ring 28 as the carrier 25 is rotated step by step by the ratchet wheel 29 operated from cam 31. When handle 38 is in the position in which it is shown in Fig. 10, and pin 40 is in a deep notch 41, the end of pawl 37 engages ratchet wheel 29 and moves it one step as arm 30 moves to the left. When the arm moves back to the right, notched wheel 34 is held by latch 36, and pin 40 is pulled back into a shallow notch 42. Upon the next movement to the left of arm 30, wheel 34 is moved a step, but pawl 37 is held out of engagement with ratchet wheel 29, so the blank carrier is not moved. Upon the next swing to the right, pin 40 is moved into a deep notch 41, ready to repeat its operative swing. By this arrangement, the carrier is moved only upon every other rotation of the main shaft. This is desirable when the blanks being treated are large and heat the dies so that more time is required for heating the blank and cooling the dies than would be allowed by the regular timing of the main shaft.

If more time should be required, notched wheel 34 may be slipped off and a wheel substituted having two or more shallow notches between successive deep notches. When smaller blanks are treated, pawl 36 may be held away from ratchet wheel 35, so that pin 40 may remain constantly in a deep notch 41, wheel 34 merely oscillating idly back and forth and allowing operative action of pawl 37 upon each swing to the left.

When it is desired to stop the feeding of blanks to the machine, or to stop the rotation of the carrier temporarily for any reason without stopping the main shaft of the machine, handle 38 may be swung outward until stop 134 encounters arm 30, in which position it will be held by spring 39 until intentionally swung inward to start the carrier.

The notches in ring 28 carry the blanks around beneath burner 43 where they are held in proper position by sliding against plate 46. While the heads 45 of the blanks pass beneath the burner they are heated to a malleable condition by the flames. This heating is effectively and economically accomplished by the separate jets of flame directed against the registering heads. It is difficult to heat the heads sufficiently by a continuous flame without excessively heating the supporting parts.

As they approach the central plane of the machine, the shanks are cooled by jets of water from receptacle 47, as indicated in Fig. 12. Immediately thereafter the blank is moved into line with the transfer device. Thereupon cam groove 72 rocks sleeve 67 to move the transfer device from the dotted line position in which it is shown in Fig. 6 to the left. Thereupon heads 86 and 87 are pried apart by encountering shank 49 of the blank and, as member 77 continues its movement to the left, the members 78 and 79 are snapped back beyond shank 49 so as to clamp it in the position indicated in Fig. 3. Thereupon groove 72 moves the carrier back to its dotted line position in Fig. 4 and then grooves 72 and 60 operate together to swing shaft 55 and sleeve 67 and carry the transfer device to the position in which it is shown in Fig. 3 in full lines. In this position the blank is held in line with punch 103 and pin 98. Cross head 91 is then moved to the left and the friction of pins 109 against rod 97 is sufficient to carry the rod and its extension 98 to the left until it impinges against the end of the blank and presses the blank against punch 103. Thereafter a continued movement of the cross head results in sliding the rod between ends of pins 109 and holds the blank between pin 98 and punch 103 while groove 72 swings arm 66 upward so that the parts assume the position in which they are shown in Fig. 4. The continued movement of the head 91 to the left forces the die over the blank so that the head is pressed around the punch, as shown in Fig. 8. This results in forming the socket 112 in the end of the head. See Figure 14. Thereafter the cross head 91 is moved to the right, carrying the punched article and rod 97 therewith until the end of the rod abuts frame member 99, whereupon the rod stops and continued movement of the cross head forces the die back over the reduced end 98 so as to discharge the shaped article from the die.

As slide 91 nears the end of its rearward stroke, knock out finger 115 is swung by lug 121 across the position of the blank, so as to knock it loose if it should stick to the socket die sufficiently to hold its place against gravity.

It will be readily understood that the shank 49 of the blank is of substantially uniform diameter and fits fairly closely within the die blocks. If the shank was heated so as to be malleable during the punching operation it would expand so tightly within the die as to stick therein. It is for this purpose that the shank of the blank is cooled before the article is placed in the die so that the heated head may be pressed into desired shape without expanding the shank so as to cause it to stick in the die. In this way it is possible to form a member with a uniform shank and with a hot pressed head without having a separable die for the shank, as would otherwise be necessary.

The method is particularly applicable to blanks which are formed by cutting off a length of wire or rod and then having heads formed thereon by cold pressing. Thereafter these heads may be reshaped, as by the punching shown in the drawings, or in other ways which would not be feasible by cold pressing. By heating the heads and cooling the shanks this final hot pressing of the head may be accomplished without undue deformation of the shank.

In the apparatus shown, it will be evident that the carrier is at rest the greater part of the time. The burner shown and described avoids the difficulty of separately adjusting many jets, and still has the advantages of single jets in directing the flames where they will be most effective in heating the heads with the least waste of heat on other parts where it is not desired. When smaller blanks are being treated and the carrier is moved more rapidly, less heat is required to bring the smaller heads to proper temperature. This correct registration of the flames upon the heads is quite important for satisfactory operation of the method and apparatus, particularly with the larger sizes of articles, as otherwise either the heads are under-heated or the carrier and shanks are over-heated.

As indicated above, the method is particularly adapted for the formation of cap screws. In employing such screws, the cylindrical outer surface of the head must be accurately concentric with the screw in order for the head to fit properly within the socket which receives it, and to permit of the turning of the head as the screw is driven home. The enclosure of the head and stem is accurately aligned, relatively immovable, and close-fitting sockets during the punching of the socket in the head insures the requisite alignment between the head and shank of the screw.

It will be readily understood that changes may be made in the various parts of the mechanism without departing from the spirit of the invention as set forth in the appended claims.

What is claimed is:—

1. The method of shaping a head in axial alignment with a shank, which comprises directing downward a series of jets of flame, intermittently moving a succession of blanks beneath said jets with their heads successively registering with said flames between successive movements and with their shanks hanging down, cooling the shanks while their heads are in the final stages of heating, introducing the blanks successively into a die having a socket fitting the cooled shank and a head-forming socket in fixed relation to its shank socket, shaping the head in said die, and discharging the shaped blank endwise by pressure against the shank.

2. The method of forming a socket in a cap screw having a socketed cylindrical head and a cylindrical shank, which consists in positioning the blank with its head up, heating the head from above, cooling the shank by the application of cooling fluid during the final stage of heating, enclosing the shank in a die fitting said shank and having a socket for the head fixedly held in accurately aligned relation to the socket for the shank, punching a socket in said head by pressure exerted against the head in the direction of the axis of the shank and simultaneously pressing the head into the socket therefor in the die, and expelling the shank from the die by pressure exerted in the opposite direction from said socket-forming pressure.

3. The method of making a socket cap screw, consisting in cutting a suitable length from a rod having a substantially uniform cross section, cold-forming on the length a head containing approximately the amount of material desired in the finished head, positioning the blank with its head up, heating the head from above, cooling the shank by application of cooling fluid during the final stage of heating, inserting the shank in a close-fitting solid-die having therein a socket for the head fixedly related to and accurately aligned with the close-fitting socket for the shank, punching a socket in the head while it is still hot and simultaneously pressing the head into the socket, and ejecting the shank endwise from the die.

4. Apparatus for forming a socket in a capscrew blank having a head and a cylindrical shank, comprising, a carrier for carrying the blank with its head up, heating means above the carrier for heating the heads, means for cooling the shank during the heating operation, a die having an opening fitting said shank and approximately fitting said head, the opening for the head being rigidly held in accurately aligned relation to the opening fitting the shank, means for inserting the blank in said die, a punch in axial alignment with the opening in said die, means to force the punch into the head of a blank in said die, an ejector in said die in alignment with said opening, and means to move the ejector against the shank of the blank after said punch has operated.

5. Apparatus for making socket cap screws, comprising a carrier adapted to carry a series of screw blanks with their heads upward, a burner above the carrier and adapted to direct flames downward upon heads of blanks in the carrier, means to direct cooling fluid against shanks of blanks in the carrier, a solid die adapted to fit the shank of a blank and having an opening for the head accurately aligned with the opening for the shank, means to transfer a blank from the carrier to the die, a punch, means to bring the punch and die together to punch a socket in the head of the blank and simultaneously press the head in the die opening therefor, and means to eject the shank from the die.

6. Apparatus for shaping a head on a shank, comprising a carrier for carrying a series of blanks with their heads up and shanks down, means for moving the carrier intermittently, a burner having jet openings directed to impinge separately upon the positions of the blank heads when the carrier is at rest, means for cooling the shanks while the heads are beneath the final jets, means to shape the heated heads, and means to transfer the blanks from the carrier to the shaping means.

7. Apparatus in accordance with claim 6, in which the carrier comprises a carrier ring notched around its periphery, an annular trough having a flange at its outer side, and a holder ring clamping the carrier ring upon said flange, the said rings forming a substantially liquid tight upper part for the outer wall of said trough with the inner side of the carrier ring exposed to liquid in the trough, the said flange and rings having expansion slits in their outer sides.

8. Apparatus in accordance with claim 6, in which the means for moving the carrier is actuated by the shaping means and includes means to move the carrier once for each selectively predetermined number of operations of the shaping means.

BIRGER W. LINDQUIST.